US008876077B2

(12) United States Patent
Maillard

(10) Patent No.: US 8,876,077 B2
(45) Date of Patent: Nov. 4, 2014

(54) SPHERICAL ORIENTING DEVICE AND METHOD FOR MANUFACTURING THE SAME

(75) Inventor: Patrick Maillard, Lausanne (CH)

(73) Assignee: Robert Bosch GmbH, Stuttgart (DE)

(*) Notice: Subject to any disclaimer, the term of this patent is extended or adjusted under 35 U.S.C. 154(b) by 587 days.

(21) Appl. No.: 12/800,439

(22) Filed: May 14, 2010

(65) Prior Publication Data

US 2010/0320356 A1  Dec. 23, 2010

(30) Foreign Application Priority Data

May 26, 2009  (EP) .................................. 09100290

(51) Int. Cl.
| | | |
|---|---|---|
| *A47G 1/24* | (2006.01) | |
| *B60R 1/02* | (2006.01) | |
| *G01C 19/20* | (2006.01) | |
| *F16M 11/12* | (2006.01) | |
| *G02B 7/182* | (2006.01) | |

(52) U.S. Cl.
CPC ........... *G02B 7/1824* (2013.01); *F16M 11/123* (2013.01); *F16M 11/12* (2013.01); *Y10S 248/913* (2013.01)
USPC ........ 248/487; 248/274.1; 248/661; 248/913; 248/660; 248/583; 248/485; 248/479; 248/278.1; 74/490.1; 74/5.9; 74/5 R; 74/5.1; 74/5.8; 359/871; 359/872; 359/873; 359/874; 359/876

(58) Field of Classification Search
USPC .............. 248/274.1, 661, 913, 660, 583, 485, 248/487, 479, 278.1; 74/490.1, 490.3, 5 R, 74/5.1, 5.8, 5.9; 359/871–874, 876
See application file for complete search history.

(56) References Cited

U.S. PATENT DOCUMENTS 3,731,544 A  5/1973  Acker et al.
4,233,634 A * 11/1980  Adams .......................... 348/373
(Continued)

FOREIGN PATENT DOCUMENTS

EP  1 746 333  7/2005

OTHER PUBLICATIONS

Raza Ur-Rehman, Stephane Caro, Damien Chablat, Philippe Wenger: "Kinematic and Dynamic Analysis of the 2-DOF Spherical Wrist of Orthoglide 5-axis" 3rd International Congress Design and Modelling of Mechanical Systems CHSM 2009j Mar. 16, 2009-Mar. 18, 2009 pp. 1-8, XP002553105 3rd International Congress Design and Modelling of Mechanical Systems CMSM 2009, Hammamet, Tunesia p. 2; figure 2.

(Continued)

*Primary Examiner* — Christopher Garft
(74) *Attorney, Agent, or Firm* — Kenyon & Kenyon LLP

(57) ABSTRACT

A spherical orienting device includes a base, first and second actuation shafts, an orientable device, an inner member, a middle member, and an outer member. The first and second actuation shafts are rotatably held by the base for rotary actuation about first and second actuation axes, respectively, which intersect orthogonally at a spherical center of rotation. The orientable device is supported by first and second revolute support joints which are disposed for rotation about an orientation axis of the orientable device and a support axis, respectively. The inner member is fixed to the first actuation shaft and linked to the second support joint. The middle member is inwardly linked to the first support joint and outwardly linked to a middle revolute joint disposed for rotation about a linkage axis. The outer member is fixed to the second actuation shaft and linked to the middle revolute joint.

8 Claims, 3 Drawing Sheets

(56) References Cited

U.S. PATENT DOCUMENTS

| | | | |
|---|---|---|---|
| 4,678,289 A * | 7/1987 | Mattelin et al. | 359/226.2 |
| 4,878,393 A * | 11/1989 | Duta et al. | 74/490.06 |
| 5,243,873 A * | 9/1993 | Demers | 74/490.06 |
| 5,418,567 A * | 5/1995 | Boers et al. | 348/375 |
| 5,966,991 A * | 10/1999 | Gosselin et al. | 74/490.1 |
| 6,484,602 B1 | 11/2002 | Dagalakis et al. | |
| 7,997,161 B2 * | 8/2011 | Chablat et al. | 74/490.03 |
| 8,167,872 B2 * | 5/2012 | Schena | 606/1 |
| 2003/0206356 A1 | 11/2003 | Orcutt | |
| 2010/0320356 A1 * | 12/2010 | Maillard | 248/487 |

OTHER PUBLICATIONS

Damien Chablat, Philipe Wenger: "A Six Degree-of-Freedom Haptic Device Based on the Orhoglide and a Hybrid Agile Aye" Proceedings of IDETC 2006, DETC2006, Sep. 10, 2006, Oct. 8, 2009, pp. 1-8, XP002553106 30th mechanisms & robotics conference, Philadelphia, USA, p. 6-7; Figures 15-17.

* cited by examiner

SPHERICAL ORIENTING DEVICE AND METHOD FOR MANUFACTURING THE SAME

BACKGROUND OF THE INVENTION

1. Field of the Invention

The present invention relates to a spherical orienting device, e.g., a two degree-of-freedom spherical orientation device driven via two actuation shafts, which supports an orientable device having an orientation axis, and the present invention further relates to a method for manufacturing such a spherical orienting device.

2. Description of Related Art

Two-dimensional spherical orienting devices, which orient an orientable payload device towards a desired direction in space by rotating it around a fixed point, are used in many fields of technology, for example in inertial sensors such as gyrometers, including in micromechanics, in gyroscopes, in orientable mirrors e.g. in two degree-of-freedom optical scanners, in gyroscopic stabilization of cameras and camera objectives, in water cannons for fire trucks or gaming, in robot wrists, artificial hands and in artillery equipment. Another important field of application is joysticks and similar input devices that sense the spherical orientation of an object rotated by a user, e.g. in user interfaces in automotive or industrial applications, in mobile hydraulic machinery, or in gaming or general computer user interfaces.

A conventional mechanism for the tilting of an orientable device into two directions is an assembly of two gimbals, i.e. pivoted supports that each allow the rotation of an object about a single axis, wherein one inner gimbal is mounted on an outer gimbal with pivot axes orthogonal or otherwise disposed at a non-collinear angle. However, in order to actuate the inner gimbal, an actuating motor or, in the case of an input device, rotational sensor has to be born by the outer gimbal. This leads to an increase of inertia for the outer gimbal, hindering fast movements, which are required in many applications.

In another conventional mechanism an orientable device is pressed onto a tip and tilted in two directions. The center of rotation is located at the apex of the tip where a bearing is installed. Due to such presence of material at the center of rotation, the object cannot be freely positioned within the mechanism, which is unsuitable for many applications. For example, in a case of the orientable device being a mirror such as in a mirror scanner application, the mechanism does not allow the mirror to be positioned such that the center of rotation lies in the mirror plane.

U.S. Pat. No. 5,966,991 discloses a two degree-of-freedom spherical orienting device in which a spherical five-bar mechanism with payload support is actuated by two rotary actuators fixed in position to a base. Payload support means for supporting a payload on an orientation axis include first and second revolute support joints each disposed for rotation about a support axis, wherein the orientation axis and each support axis pass through the spherical center of rotation in mutually orthogonal disposition. An inner sphere arm fixed to the shaft of the first rotary actuator is linked to the first revolute support joint of the payload support, the first actuator axis disposed orthogonal to the first support axis. A middle sphere arm is radially inwardly linked to the second revolute support joint of the payload support and outwardly linked to a middle revolute joint disposed for rotation about a linkage axis passing through the spherical center of rotation, the linkage axis disposed orthogonal to the second support axis. An outer sphere arm is fixed to the shaft of the second rotary actuator and linked to the middle revolute joint, the linkage axis disposed orthogonal to the second actuator axis.

Although the disclosed orienting device allows the payload to be positioned at the geometric center of rotation, the device requires a large spherical internal free space around the payload, independent of the shape of the payload to be oriented and of its orientation. Since in general applications orientable payload devices such as listed above are typically not spherically shaped, this leads to an undesirable large space requirement, in particular for orientable payload devices considerably deviating from a spherical shape, e.g. flat or elongate pay-loads. Large distances of the inner, outer, and middle sphere arms from the orientable device furthermore unfavorably influence high-speed operation due to an increased moment of inertia and the possibility of parasitic movements.

It is therefore desirable to provide a spherical orienting device that enables to orient non-spherical payload devices, in particular at high speed, without requiring a large installation space.

BRIEF SUMMARY OF THE INVENTION

In accordance with the present invention, a spherical orienting device is provided which includes a base, first and second actuation shafts, an orientable device, an inner member, a middle member, and an outer member. The first and second actuation shafts are rotatably held by the base for rotary actuation about first and second actuation axes, which intersect orthogonally at a spherical center of rotation. The orientable device is supported by first and second revolute support joints, the first support joint being disposed for rotation about an orientation axis of the orientable device and the second support joint being disposed for rotation about a support axis, which orthogonally intersects the orientation axis at the spherical center of rotation. The inner member is fixed to the first actuation shaft and linked to the second support joint, the first actuation axis being disposed orthogonal to the support axis. The middle member is inwardly linked to the first support joint and outwardly linked to a middle revolute joint disposed for rotation about a linkage axis, which passes through the spherical center of rotation and is disposed orthogonal to the orientation axis. The outer member is fixed to the second actuation shaft and linked to the middle revolute joint, the linkage axis being disposed orthogonal to the second actuation axis.

Because the first support joint is disposed for rotation about the orientation axis of the orientable device, the rotational movement of the middle member with respect to the orientable device describes a generated surface of rotational symmetry around the orientation axis. This enables the middle member to be formed according to an outer contour of the orientable device even when the orientable device substantially deviates from a spherical shape. In particular in typical cases such as mirrors, lenses, cameras, joysticks, cannons or nozzles, where orientable devices typically are flat, disk-like or elongate, tube-like objects that deviate clearly from spherical symmetry but exhibit at least in portions an approximate rotational symmetry around the orientation axis, the middle member is enabled to be shaped to closely conform to the outer contour of the orientable device with minimal gap. Therefore, little installation space is required, while reliable high-speed operation is enabled through a minimized moment of inertia and prevention of parasitic movements.

According to an example embodiment, the orientable device is an optical device, the orientation axis being an optical axis of the optical device. Such devices typically are constructed at least in portions from mirrors, lenses, apertures, tubes etc. arranged with rotational symmetry around the optical axis. Thus, the middle member is enabled to be shaped to conform to the outer shape of the optical device or the rotationally symmetric portion thereof with particularly little gap. Preferably, the orientable device is a mirror, wherein the orientation axis perpendicularly intersects a mirror surface of the mirror. This enables to construct e.g. scanners, projectors and similar ray-reflecting devices that are compact and operable at high speed, even for THz applications, where relatively large mirrors are required due to the longer wave-lengths of THz radiation as compared to visible light. Preferably, the orientation axis intersects the mirror surface at the spherical center of rotation.

According to an example embodiment, the orientable device has a substantially disk-like shape. The middle member comprises a radial leg extending radially along a rear side of the orientable device. This enables the orienting device to be constructed in a particularly compact way, with only minimal material required for the middle member.

According to an example embodiment, at least one of the first support joint, the second support joint and the middle revolute joint comprises an elastic joint. This enables to reduce manufacturing cost because the number of parts and the number of assembly steps are reduced.

According to an example embodiment, the orientable device has an outer shape substantially rotationally symmetric around the orientation axis. The middle member comprises a sheath having an inner shape corresponding to the outer shape of the orientable device. The sheath rotatably holds the orientable device. In this way, a small moment of inertia of the middle member and thus of the moving parts of the orienting device is enabled to be achieved even in the case of elongate orientable devices, since the middle member does not have to e.g. extend longitudinally along the length of the orientable device. Furthermore, also orientable devices such as lenses that require both a rear and a front path along the orientation axis to remain unobstructed during operation are enabled to be oriented.

Preferably, the sheath comprises at least one slit circumferentially extending around the orientation axis, the second support joint being configured to support the orientable device through the slit. In this way, the sheath is enabled to be positioned anywhere along the length of the orientable device. For example, the sheath can be positioned such that the mass center of the orientable device is located within the volume surrounded by the sheath, thus enabling smooth control of the rotation at high speed.

Under a further aspect, a method for manufacturing the spherical orienting device is provided. The method comprises a step of providing a substrate, and a further step, in which at least two of the base, the inner member, the middle member, and the outer member are formed from the substrate. In this way, the orienting device enabled to be manufactured at low cost and small overall size, e.g. as a micromechanical device. A small overall size in turn enables a small moment of inertia and in consequence particularly high operation speed. Preferably, the substrate is a silicon wafer substrate such that conventional, efficient processes of micromechanical manufacturing can be employed.

According to an example embodiment, when the orienting device comprises a mirror, the method further comprises forming the mirror from the substrate. This further simplifies the manufacturing process by reducing the number of parts and the number of assembly steps.

According to an example embodiment, the method further comprises forming at least one of the first support joint, the second support joint and the middle revolute joint as an elastic joint from the substrate. This enables further miniaturization and cost reduction since less precision is required in manufacturing such elastic joints. Furthermore, the elastic joint can be configured to function as a spring e.g. for returning the orienting device into a neutral position, or as an electric connection to the orientable device.

DETAILED DESCRIPTION OF THE INVENTION

Figure 1:
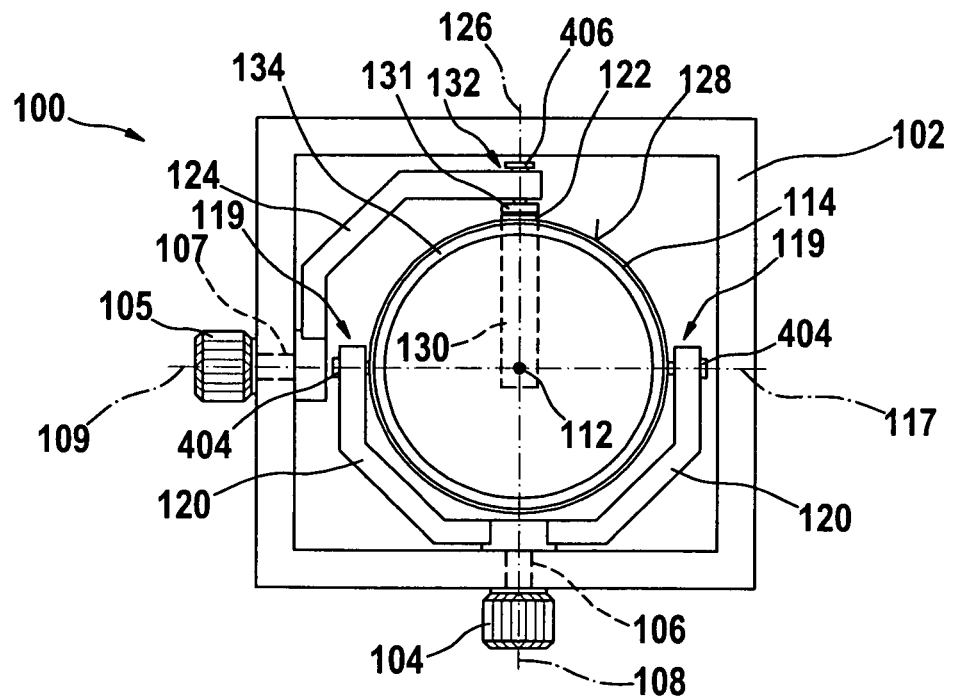
FIG. 1 shows a front elevation view of a spherical orienting device according to an embodiment of the present invention.
Figure 2:
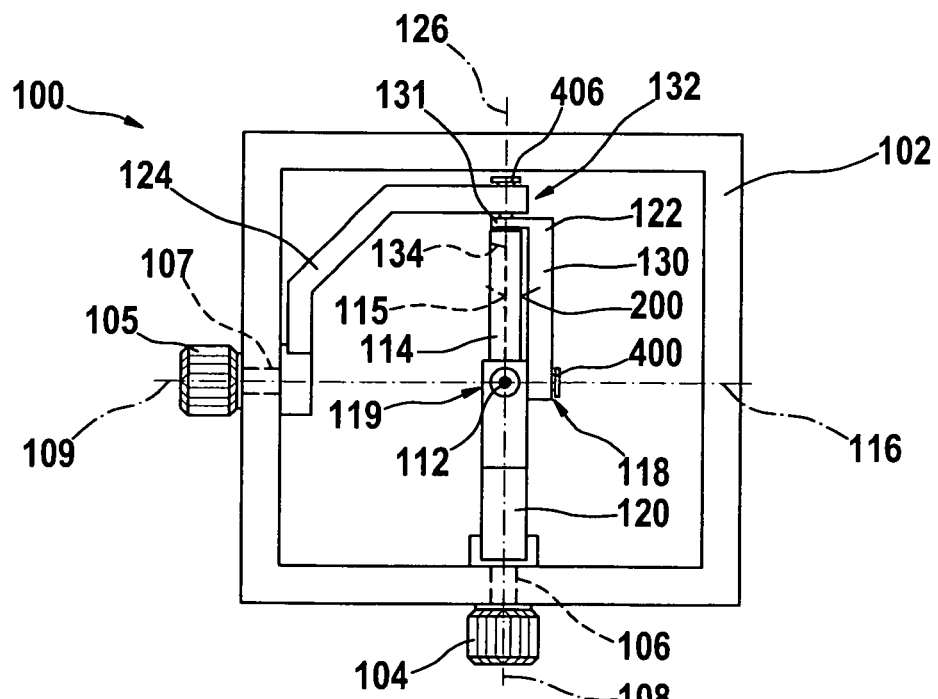
FIG. 2 shows a front elevation view of the orienting device of FIG. 1, in which a first actuation shaft has been rotated 90° as compared to FIG. 1.
Figure 3:
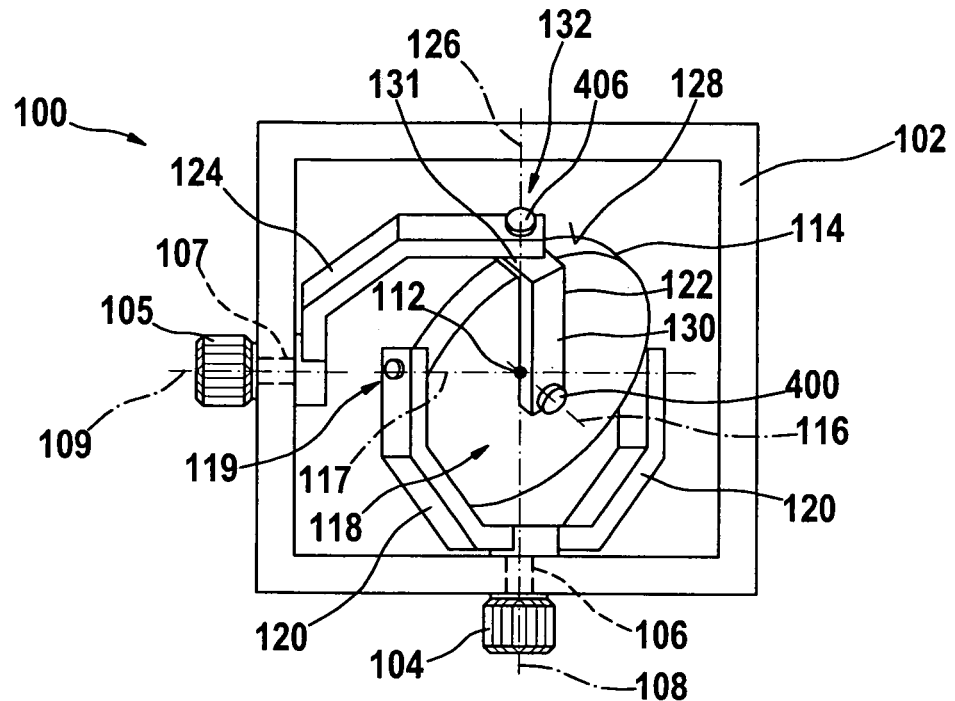
FIG. 3 shows a front elevation view of the orienting device of FIG. 1, in which the first actuation shaft has been rotated 135° as compared to FIG. 1, and a second actuation shaft has been rotated 45° as compared to FIG. 1.

FIGS. 1-3 depict a spherical orienting device 100 including a mirror 114 as a payload to be oriented in space, relative to a fixed base 102. The base 102 is formed as a rectangular frame, which surrounds the mirror 114. In FIGS. 1-3, the rectangular frame of the base 102 lies in the drawing plane.

The mirror 114 comprises an outer shape substantially conforming to a disk of rotational symmetry around an orientation axis 116, bounded by a cylindrical peripheral surface 128. FIG. 1 shows the mirror 114 arranged in a neutral position in which it is oriented parallel to the drawing plane, i.e. the plane defined by the base frame 102. The side of the mirror 114 facing the observer comprises a circular reflecting mirror plane 115. A rim 134 circumscribing the mirror plane 115 is formed on the side of the mirror plane 115 along the periphery of the mirror 114, such that the mirror plane 115 as a whole is recessed with respect to the mirror's 114 cylindrical outer shape. In FIGS. 2 and 3, the mirror 114 is shown to have been rotated around a spherical center of rotation 112, into two different exemplary orientations with respect to the base frame 102. The mirror 112 is positioned such that the spherical center of rotation 112 coincides with the center of its circular mirror plane 115.

On the rear surface 200 of the mirror 114, i.e. the side of the mirror 114 opposed to the mirror plane 115, a central shaft 400 is formed that projects away from the center of the rear surface 200 with cylindrical symmetry around the orientation axis 116 of the mirror 114. An L-shaped middle member 122 is provided comprising a radial leg 130, which radially extends from the central shaft 400 along the rear surface 200 outward until slightly beyond the periphery 128 of the mirror 124, and a longitudinal leg 131, which extends perpendicularly from the outer end of the radial leg 130 towards the front side of the mirror 114. The radial leg 130 of the middle member 122 comprises a bore in which the central shaft 142 is rotatably held, thus forming a first revolute support joint 118 supporting the mirror 114 rotatably on its orientation axis 116.

A first rotary actuator 104 and a second rotary actuator 105 are rigidly mounted on adjacent sides of the base frame 102, each in a position close to the center of the respective frame side. The rotary actuators 104, 105 are e.g. configured as electric stepping motors. The first actuator 104 comprises a first actuation shaft 106 arranged along a first actuation axis 108, while the second actuator 105 comprises a second actuation shaft 107 arranged along a second actuation axis 109. Each actuation shaft 106, 107 is rotatably guided through a respective bore in the base frame 102 from the corresponding actuator 104, 105 into the interior space surrounded by the base frame 102, with both actuation axes 108, 109 intersecting perpendicularly at the spherical center of rotation 112.

On the interior-facing side of the bore guiding the first actuation shaft 106, two inner members 120 are fixed to the first actuation shaft 106, extending perpendicularly therefrom into opposing directions. Each of the inner members 120, although in the present embodiment formed from piecewise linear portions, follows the general shape of an arc subtending a 90° angle, with an inner radius of the arc that is slightly greater than an outer radius of the cylindrical peripheral surface 128 of the mirror 114. Together, both inner members form a general shape of a combined arc subtending a 120° angle.

Each inner member 120 comprises at its end a bore which rotatably holds one of two support shafts 404 radially extending from diametrically opposed positions of the cylindrical peripheral surface 128 of the mirror 114. Each support shaft 404 together with the corresponding bore forms a first revolute support joint 119, such that the inner members 120 support the mirror 114 rotatably on a support axis 117 defined by a common symmetry axis of the support shafts 404. The support axis 117 passes through the spherical center of rotation 112 and is disposed orthogonal to both the first actuation axis 108 and the orientation axis 116 of the mirror 114.

On the interior-facing side of the bore guiding the second actuation shaft 107 through the base frame 102, an outer member 124 is fixed to the second actuation shaft 107, extending perpendicularly therefrom. The outer member 124, although in the present embodiment formed from piecewise linear portions, approximately follows the general shape of an arc subtending a 90° angle, with an inner radius of the arc that is slightly greater than an outer radius of the inner members 120. As can be seen in FIG. 1, the outer member 124 is formed such that in a position where the inner members 120 and the mirror 114 are rotated into an orientation coplanar with the plane defined by the base frame 102, i.e. by the actuation axes 108, 109, and the outer member 124 is rotated into a position coplanar with the plane defined by the base frame 102 and facing away from the side of the first actuator 104, the outer member 124 does not touch the mirror 114 nor the inner members 120.

The outer member 124 comprises at its end a bore which rotatably holds a middle shaft 406 that radially extends outward from the longitudinal leg 131 of the middle member 122. Together, the middle shaft 406 and corresponding bore form a middle revolute joint 132 configured for rotation around a linkage axis 126 that passes through the spherical center of rotation 112 and is configured orthogonal to the orientation axis 116 of the mirror 114.

As demonstrated in FIGS. 2 and 3, the mirror 114 is enabled to be rotated into arbitrary spherical orientations over a large angular range by rotary actuation of the actuation shafts 106, 107. In FIG. 2, the first actuation shaft 106 has been rotated by 90°—counter-clockwise as seen from the first actuator 104—from the position shown in FIG. 1. In FIG. 3, the second actuation shaft 107 has been rotated further into the same direction over a total of 135° C. from its position in FIG. 1 while the first actuation shaft 109 has been rotated by 45°—clock-wise as seen from the second actuator 105—from its position in FIG. 1.

Figure 4:
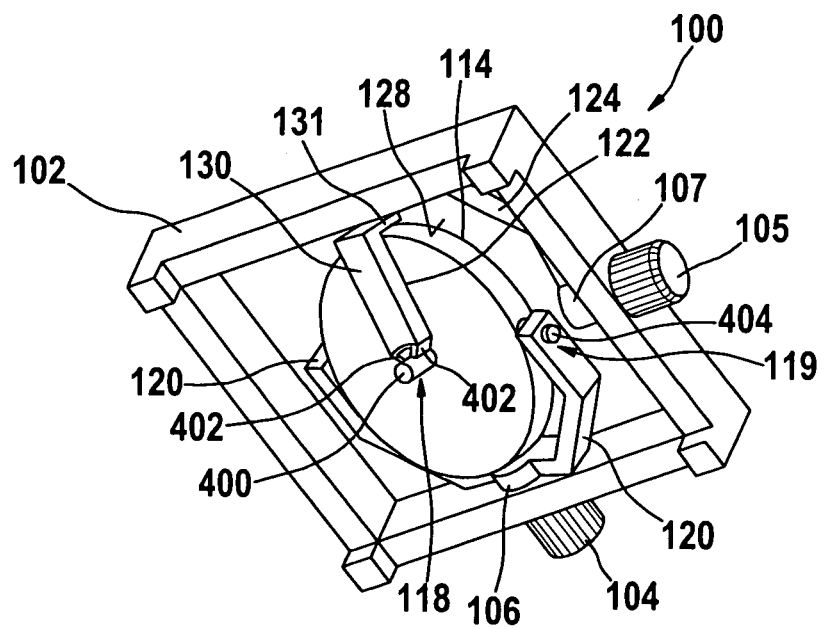
FIG. 4 shows a rear perspective view of a spherical orienting device according to another embodiment of the invention.

FIG. 4 shows an embodiment in which the central shaft 400 and the radial leg 130 of the middle member 122 are connected by a pair of elastic lamellae 402, thus providing the first support joint 118 as an elastic bearing. In alternative embodiments, additionally or alternatively any of the second support joints 119 and/or the middle revolute joint 132 can be configured as an elastic bearing.

Figure 5:
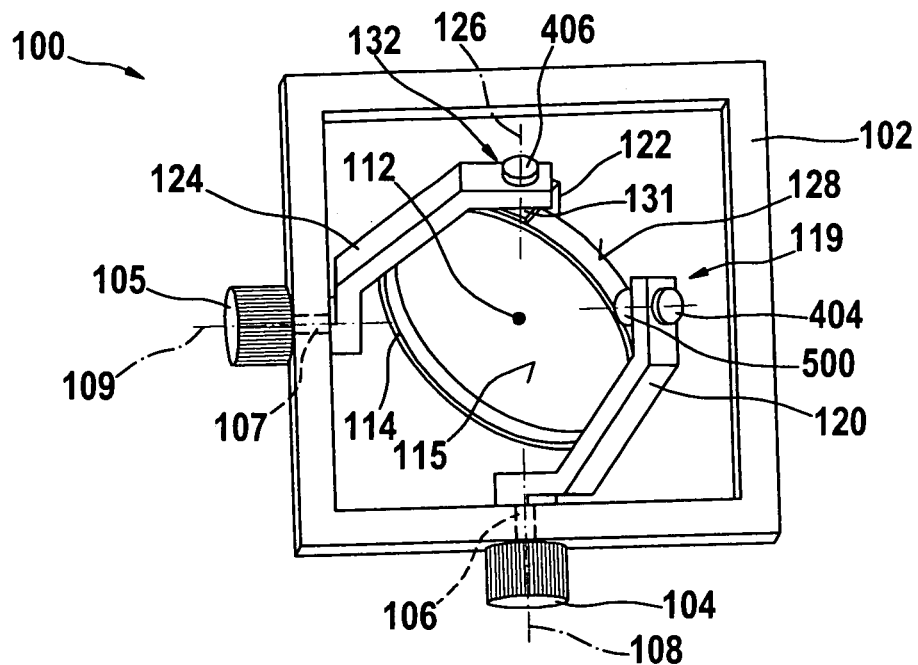
FIG. 5 shows a front perspective view of a spherical orienting device according to another embodiment.

FIG. 5 shows an embodiment comprising only a single inner member 120 and a single second revolute support joint 119. In this embodiment, the outer member 124 is identical in shape to the inner member 120, which has the advantage of reducing the number of distinct parts to be manufactured. Furthermore, due to the similarity in shape the inner 120 and outer 124 sphere members are similar in their mechanical properties such as their respective moment of inertia around the corresponding actuation axis 108, 109 as well as their elastic bending properties etc. This enables the orientation device 100 to respond substantially in a similar to actuation from either one of the actuators 104, 105, leading to particularly smooth and precise operation. A spacer ring 500 has been inserted between the inner member 120 and the peripheral surface 128 of the mirror 114, corresponding in length to the radial thickness of the longitudinal leg 131 of the middle member 122, thus enabling identically shaped inner 120 and outer 124 sphere members to be used.

Figure 6:
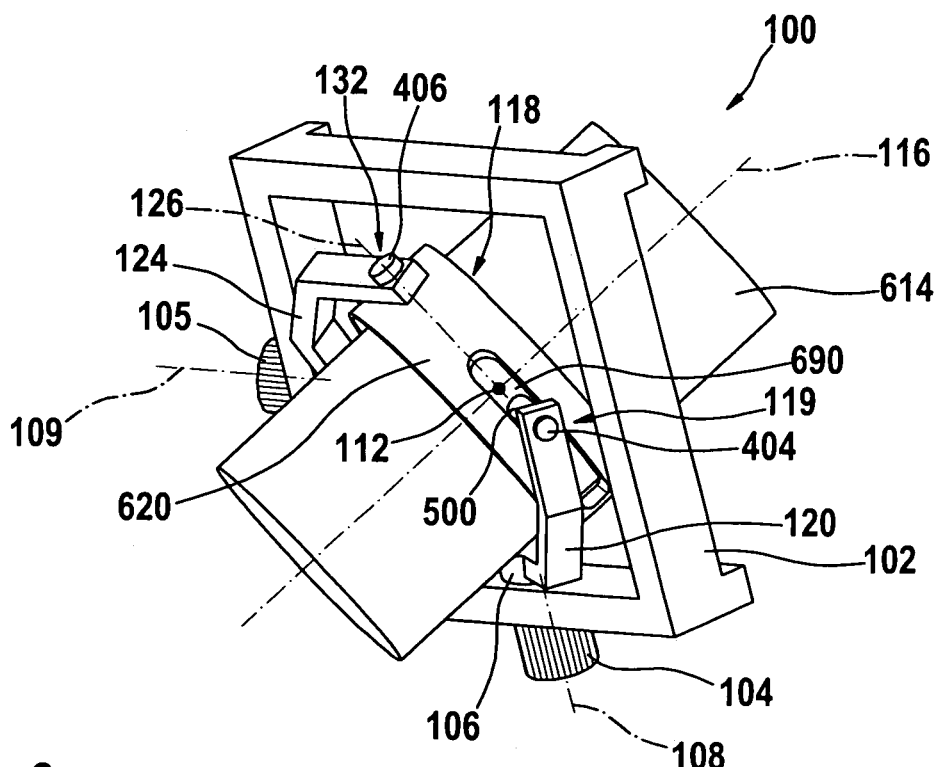
FIG. 6 shows a perspective view of a spherical orienting device according to a further embodiment.

FIG. 6 shows a further embodiment in which the orientable device 614 is of an elongated cylindrical shape, rotationally symmetric around the orientation axis 116. Examples of the orientable device 614, which for simplification purposes is shown as a plain cylinder, can include a lens system or camera, robotic arm, joystick, spotlight, water cannon or nozzle. Here, the middle member, L-shaped in the embodiments of FIGS. 1-5, is a cylindrical sheath 620 with an inner diameter that is slightly larger than the outer diameter of the cylindrically-shaped orientable device 614. Within the sheath 620, the orientable device 614 is held rotatably around the orientation axis 116. The sheath 620 and the outer shape of the orientable device 614 itself thus form the first support joint 118 in the present embodiment.

In two diametrically opposed sections of the sheath 620 circumferential slits 690 are formed, each extending over an angle of approximately 90°. The support shafts 404 of the second revolute support joints 119 rotatably connect the orientable device 615 to the inner members 120, each through a corresponding one of the slits 690. When the orientable device 614 is rotated around its orientation axis 116, the support shafts 404 slide along the length of the corresponding slit 690. Between the inner member 106 and the orientable device 614, spacer rings 500 have been inserted, which are slightly longer than a difference between outer radii of the orientable device 614 and the sheath 620, thus preventing friction and enabling identically shaped inner 120 and outer 124 sphere members to be used, with similar advantages as in the embodiment of FIG. 5.

The orienting devices 100 as shown in FIGS. 1-6 are manufacturable substantially by using micromechanical manufacturing methods. For example, the orienting device of FIG. 1-3 can be seen in FIG. 1 in a neutral position where all major structural parts, i.e. the base 102, the mirror 114, the inner member 120, the middle member 122, and the outer member 124 lie within a flat volume defined by the outer dimensions of the base frame 102. In an exemplary micromechanical manufacturing process, these parts are shaped from a common substrate, e.g. a conventional silicon wafer comprising a thickness that corresponds to a height of the base frame 102, perpendicularly to the drawing plane of FIGS. 1-3. In a further step, the mirror surface 115 is formed on the mirror 114 e.g. by metal evaporation.

Moreover, also the orienting devices 100 of FIGS. 4 and 5, as well as the orienting device 100 of FIG. 6 when excluding the orientable device 620, can be rotated into a neutral position substantially as shown in FIG. 1 wherein all major structural parts lie within a flat volume defined by the outer dimensions of the respective base frame 102, thus rendering them suitable in principle for being manufactured by micromechanical processes from a common substrate. Furthermore suited to such processes is the forming of one or more of the revolute joints 118, 119, 132 as elastic joints, such as the elastic first support joint 118 of the orienting device of FIG. 4.

What is claimed is:

1. A spherical orienting device, comprising:
   a base;
   first and second actuation shafts rotatably held by the base and configured for rotary actuation about first and second actuation axes, respectively, wherein the first and second actuation axes intersect orthogonally at a spherical center of rotation;
   an orientable device supported by first and second revolute support joints, wherein the first support joint is configured for rotation about an orientation axis of the orientable device and the second support joint is configured for rotation about a support axis orthogonally intersecting the orientation axis at the spherical center of rotation;
   an inner member fixed to the first actuation shaft and linked to the second support joint, wherein the first actuation axis is disposed orthogonal to the support axis;
   a middle member inwardly linked to the first support joint and outwardly linked to a middle revolute joint disposed for rotation about a linkage axis passing through the spherical center of rotation; and
   an outer member fixed to the second actuation shaft and linked to the middle revolute joint;
   wherein the linkage axis is disposed orthogonal to the orientation axis and the linkage axis is disposed orthogonal to the second actuation axis; and
   the outer member is rotatable by 360 degrees.

2. The spherical orienting device of claim 1, wherein the orientable device is an optical device, the orientation axis being an optical axis of the optical device.

3. The spherical orienting device of claim 2, wherein the orientable device is a mirror, the orientation axis intersecting a mirror surface of the mirror perpendicularly at the spherical center of rotation.

4. The spherical orienting device of claim 1, wherein the orientable device has a substantially disk-like shape, and wherein the middle member includes a radial leg extending radially along a rear side of the orientable device.

5. The spherical orienting device of claim 2, wherein the orientable device has a substantially disk-like shape, and wherein the middle member includes a radial leg extending radially along a rear side of the orientable device.

6. The spherical orienting device of claim 3, wherein the orientable device has a substantially disk-like shape, and wherein the middle member includes a radial leg extending radially along a rear side of the orientable device.

7. A spherical orienting device, comprising:
   a base;
   first and second actuation shafts rotatably held by the base and configured for rotary actuation about first and second actuation axes, respectively, wherein the first and second actuation axes intersect orthogonally at a spherical center of rotation;
   an orientable device supported by first and second revolute support joints, wherein the first support joint is configured for rotation about an orientation axis of the orientable device and the second support joint is configured for rotation about a support axis orthogonally intersecting the orientation axis at the spherical center of rotation;
   an inner member fixed to the first actuation shaft and linked to the second support joint, wherein the first actuation axis is disposed orthogonal to the support axis;
   a middle member inwardly linked to the first support joint and outwardly linked to a middle revolute joint disposed for rotation about a linkage axis passing through the spherical center of rotation; and
   an outer member fixed to the second actuation shaft and linked to the middle revolute joint;
   wherein the linkage axis is disposed orthogonal to the orientation axis and the linkage axis is disposed orthogonal to the second actuation axis; and
   the outer member is rotatable by 360 degrees.

8. The spherical orienting device of claim 1, wherein the base is a frame surrounding the orientable device on at least two sides.

* * * * *